Oct. 18, 1949.  A. R. PEZZILLO  2,485,408
MOTOR PUMP UNIT

Filed May 14, 1948  2 Sheets-Sheet 1

Inventor
Albert R. Pezzillo
By
Herbert S. Fairbanks
Attorney

Oct. 18, 1949.　　　　A. R. PEZZILLO　　　　2,485,408
MOTOR PUMP UNIT
Filed May 14, 1948　　　　　　　　　　　　　　2 Sheets-Sheet 2
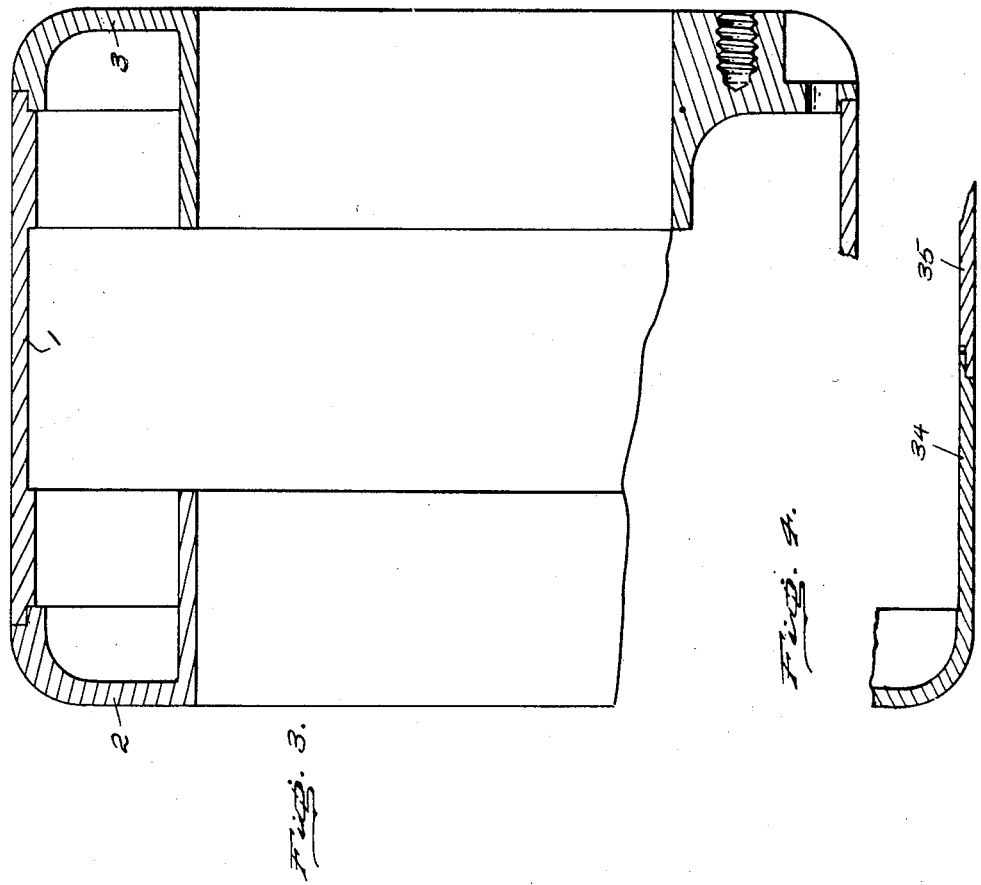
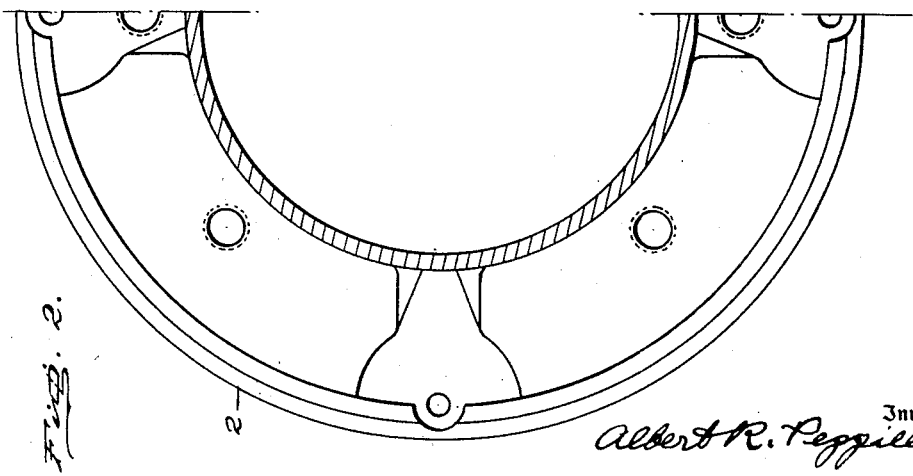
Inventor
Albert R. Pezzillo
By
Herbert S. Fairbanks
Attorney Patented Oct. 18, 1949

2,485,408

UNITED STATES PATENT OFFICE 2,485,408

MOTOR PUMP UNIT

Albert R. Pezzillo, Philadelphia, Pa., assignor to Republic Industries, Inc., Philadelphia, Pa., a corporation of Pennsylvania Application May 14, 1948, Serial No. 27,031

5 Claims. (Cl. 103—87)

The object of this invention is to devise a novel motor pump unit of the type wherein a tubular rotor is provided in which the impeller is mounted, and the unit is adapted to be directly connected in a pipe line.

A further object of the invention is to devise a motor pump unit in which the number of parts have been reduced to a minimum, thereby providing a construction which can be assembled or taken apart with a minimum amount of labor and expense.

A further object of the invention is to provide novel means for the high pressure lubrication of the bearing for the impeller.

A further object of the invention is to provide novel molded end flanges which eliminates the necessity of separate gaskets and isolates from the system electrical and mechanical vibrations and noise which would otherwise be translated through the pipe line of the system.

A non-magnetic cylinder having high electrical resistance has a shrink fit in the stator housing and isolates the stator windings from the fluid being impelled, the housing being also filled with insulating material.

If the pump is to be submerged in the fluid being pumped or circulated and the motor is of the split phase type, the starting mechanism for the motor is installed at a location remote from the motor pump unit.

With the foregoing and other objects in view as will hereinafter clearly appear, my invention comprehends a novel motor pump unit, which can be installed in any desired position in the circulating system.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized, and the invention is not limited to the exact arrangement and organization of these instrumentalities as herein set forth.

Figure 2 is a section on line 2—2 of Figure 3.

Figure 3 is a sectional view of a portion of the stator.

Figure 4 is a detail showing another embodiment of the invention wherein the outer housing cylinder is sectional.

Similar numerals of reference indicate corresponding parts.

Figure 1:
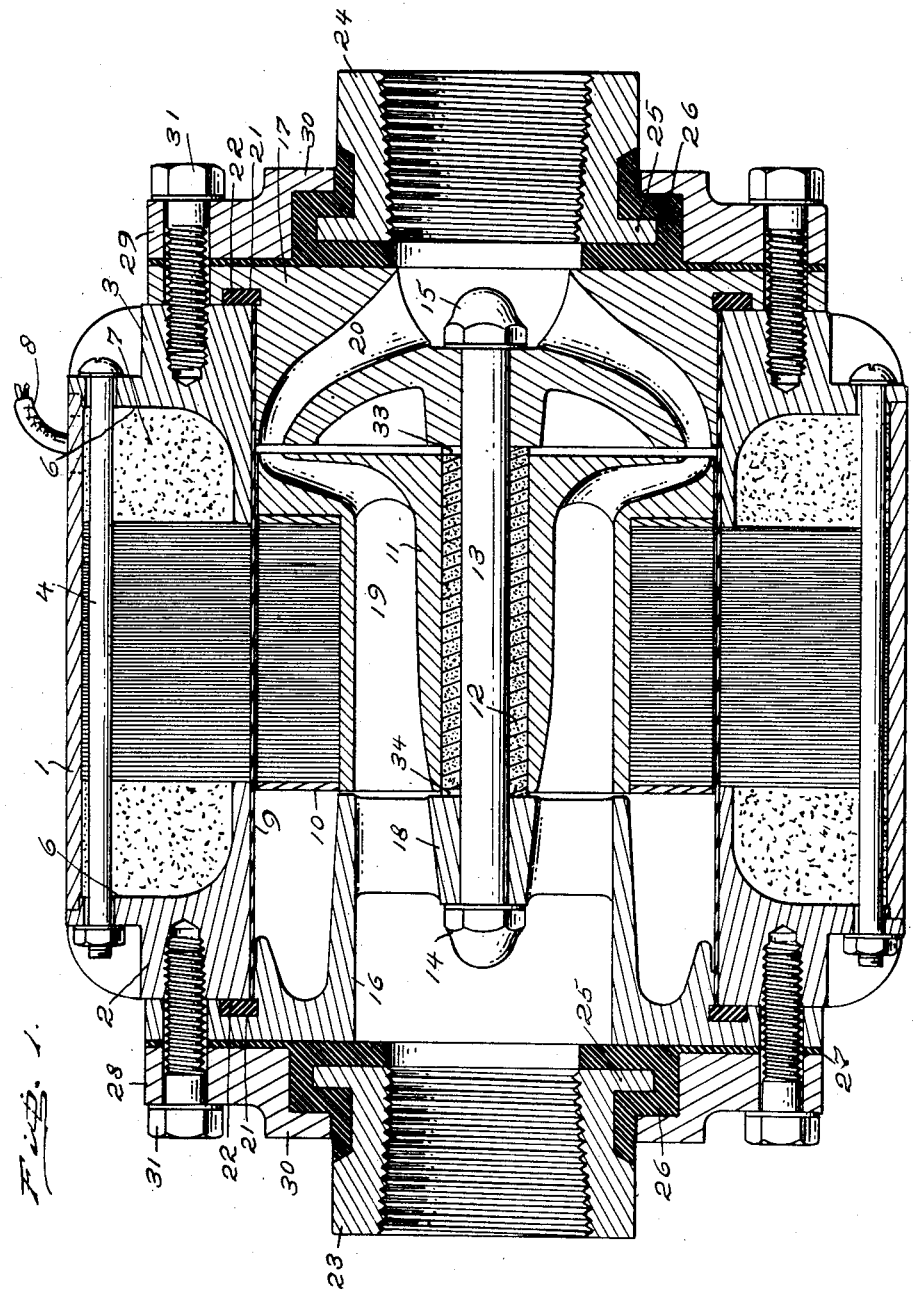
Figure 1 is a sectional elevation of a motor pump unit, embodying the invention.

Referring to the drawings:

The stator of the motor pump unit has an outer cylinder 1 and end bells 2 and 3 secured in sealed relationship with each other by studs and their bolts 4 which pass through the stator laminations 5, against which latter the end bells abut. The end bells are recessed as at 6 to receive the stator windings and are filled with an insulating material 7. A conductor 8 is connected in the usual manner with the stator windings.

A cylinder 9 of non-magnetic material having high electrical resistance has a shrink fit in the bore of the stator housing. This is accomplished by raising the temperature of the housing assembly, lowering the temperature of the cylinder and pressing them together.

The rotor 10 is tubular and an impeller 11 has a press fit in it. The bearing 12 for the rotor is in the form of a carbon sleeve mounted on a stationary shaft 13, which is fixed by nuts and washers 14 and 15 to end members 16 and 17. The intake end of the shaft passes through a bracket 18.

The impeller has passages 19 which taper forwardly and outwardly, then radially and then forwardly to the forwardly converging passages 20 in the diffuser formed by the end member 17.

The end members 16 and 17 are flanged to overhang the end bells and are each provided with an annular slot 21 having insulating packing 22 which cooperates with the cylinder 9 to seal it and to isolate the stator windings from the fluid being impelled.

Coupling members 23 and 24 are of the same constructing and therefore a detailed description of one of them is believed to be sufficient. Each coupling member has a flange 25 around which a sealing gasket 26 is molded, said gasket having a sealing flange 27 which extends over its juxtaposed member 16 or 17.

End clamping rings 28 and 29 have each an offset flange 30 which overhangs the end faces of the gaskets 26, and the end rings are fixed to the end bells by bolts 31.

The coupling members 23 and 24 are threaded for direct connection to the pipe line of a circulating system.

A slot 33 in the diffuser formed by the end member 17 introduces fluid for high pressure lubrication of the bearing, and a slot 34 in the carbon sleeve bearing 12 discharges the lubrication to the low pressure side of the impeller. This carbon sleeve extends beyond the intake end of the impeller and rotor.

If desired the outer cylinder of the stator may be formed of interlocking sections 34 and 35 as shown in Figure 4, integral with the end bells.

If the pump is to be submerged in a liquid and the motor is of the split phase type, the starting mechanism for the motor is installed at a location remote from the pump.

The operation will now be apparent to those skilled in this art and is as follows:

Assuming that the motor pump unit has been connected in a pipe line and the motor is started, the fluid flows from the intake end through the passages 19 and 20 and discharges through the coupling 24 to the pipe line of the circulating system.

Upon removal of the bolts 31 at one end and removal of a coupling member end ring and end member, the rotor can be removed as a unit of structure for inspection or cleaning.

The molded gaskets of the end coupling members isolate mechanical vibration and noise and electrical impulses from the system, and due to their flanges eliminate the necessity of a separate gasket for the end rings.

The rotor bearing is self lubricated during the life of the unit due to the provision and location of the slots 33 and 34.

The construction as herein disclosed has been found to have high electrical efficiency and pumping capacity.

Having thus described the invention, what I claim as new and desire to secure by Letters Patent is:

1. In a motor pump unit, a stator having a housing, a tubular rotor in the stator, an impeller within the rotor, a carbon sleeve bearing for the rotor, end members at the intake and discharge ends of the rotor, the member at the discharge end acting as a diffuser, a shaft fixed in said end members and on which the sleeve bearing is mounted, coupling members having gaskets molded thereon with flanges overhanging the end members, clamping rings engaging said gaskets and their flanges, and bolts securing said clamping rings and end members to the stator housing.

2. The construction defined in claim 1 wherein means are provided in the diffuser and bearing sleeve for high pressure lubrication of the bearing by the fluid being impelled.

3. A coupling member having a threaded portion and a passage, and a gasket molded on said member and having an outwardly extending flange having openings to receive fastening devices to secure the coupling member to another member.

4. In a motor pump unit, a stator having an outer cylinder, laminations, and end bells abutting the laminations, stay rods securing the foregoing parts together, a non-magnetic cylinder having high electrical resistance and sealed in the bore of the stator, a tubular rotor within said cylinder, an impeller having a press fit in said rotor, end members fitting the bore of the stator and having means to seal the ends of the cylinder, a shaft fixed to said end members, a carbon sleeve bearing on said shaft and carried by the rotor and extending beyond it at the intake end to form a thrust bearing, a slot in an end member to pass high pressure lubrication to the bearing, the bearing having a slot to discharge the lubrication to the low pressure side of the rotor, an impeller in the rotor, coupling members juxtaposed to the end members, and means to clamp the coupling members to the end members and stator and to seal the non-magnetic cylinder with the end members.

5. The construction defined in claim 4, wherein the end bells are recessed and the recesses are filled with insulating material.

ALBERT R. PEZZILLO.

No references cited.